United States Patent [19]
Salsburg

[11] Patent Number: 5,428,758
[45] Date of Patent: Jun. 27, 1995

[54] METHOD AND SYSTEM FOR REMAPPING MEMORY FROM ONE PHYSICAL CONFIGURATION TO ANOTHER PHYSICAL CONFIGURATION

[75] Inventor: Linda B. Salsburg, West Chester, Pa.

[73] Assignee: Unisys Corporation, Blue Bell, Pa.

[21] Appl. No.: 270,235

[22] Filed: Jul. 1, 1994

Related U.S. Application Data

[63] Continuation of Ser. No. 698,514, May 10, 1991, abandoned.

[51] Int. Cl.$^6$ ............................................. G06F 12/02
[52] U.S. Cl. ............................................. 395/400
[58] Field of Search .................. 395/400, 425; 364/DIG. 12 MS File, DIG. 2 MS File, 245, 245.2, 245.31, 964.6, 970, 970.2, 970.15

[56]        References Cited
         U.S. PATENT DOCUMENTS

| | | | |
|---|---|---|---|
| 3,803,560 | 4/1974 | DeVoy et al. | 395/575 |
| 4,473,878 | 9/1985 | Zolnowsky et al. | 395/400 |
| 4,519,032 | 5/1985 | Mendell | 395/425 |
| 4,736,293 | 4/1988 | Patrick | 395/425 |
| 4,908,789 | 3/1990 | Blokkum et al. | 395/425 |
| 5,202,994 | 4/1993 | Begur et al. | 395/700 |
| 5,237,668 | 8/1993 | Blandy et al. | 395/400 |

OTHER PUBLICATIONS

Tzou, Shin-Yuan, "Performance of message-passing using restricted virtual memory remapping", Practice and Experience vol. 21(3) Mar. 1991 pp. 251-267.

*Primary Examiner*—Jack A. Lane
*Attorney, Agent, or Firm*—Robert R. Axenfeld; Mark T. Starr

[57]           ABSTRACT

The present invention relates to the remapping of the physical addresses of a computer memory without affecting the logical addresses in use by executing programs. This invention provides a method and system for dynamically relocating data in a memory system, particularly one with an interleaved organization. The size of the new location could be expanded or contracted and could be interleaved, as the case may be. The reconfiguration of physical memory is accomplished without disturbing the integrity of the data or the logical addresses in use by executing programs.

11 Claims, 5 Drawing Sheets

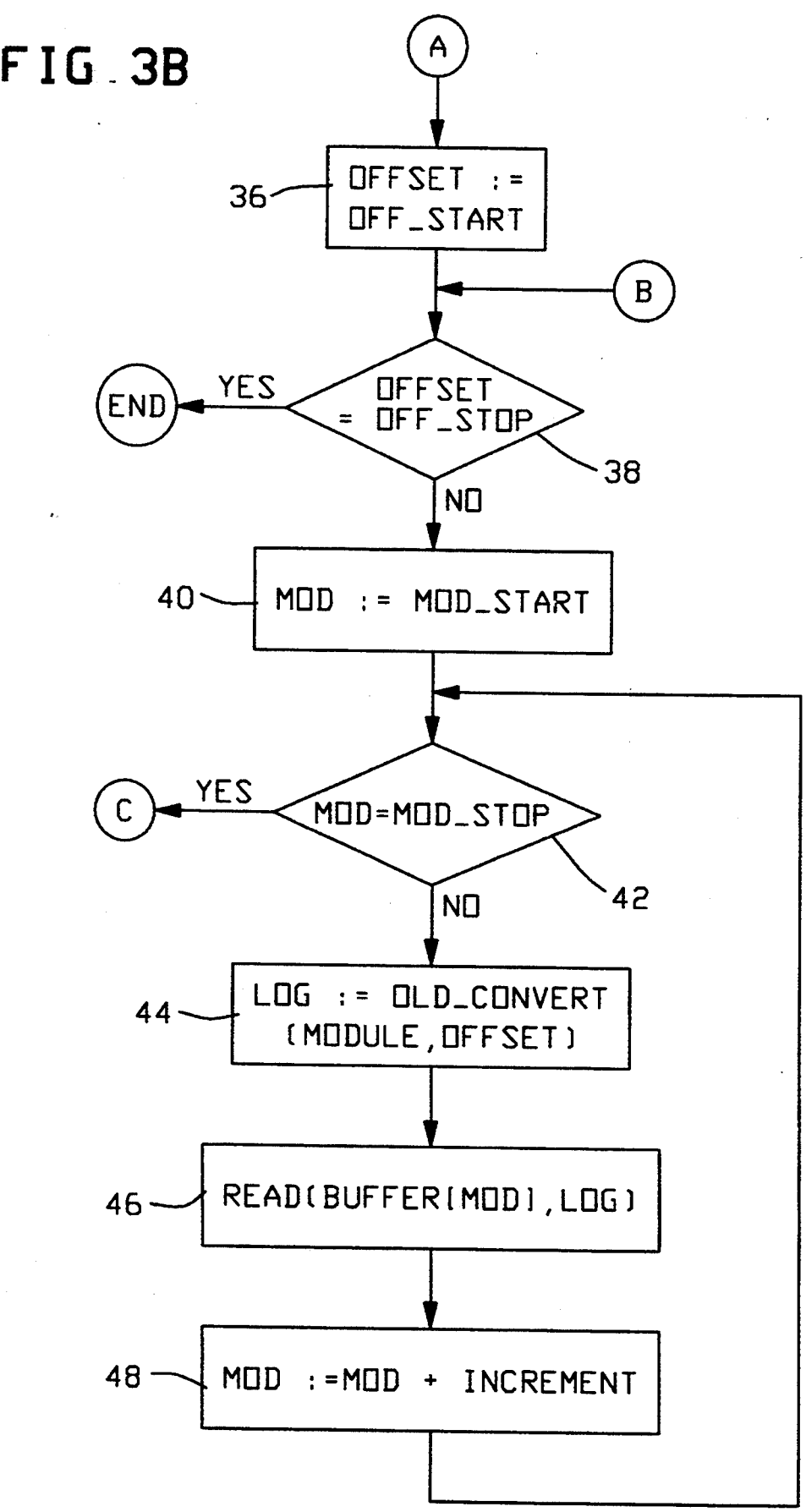

METHOD AND SYSTEM FOR REMAPPING MEMORY FROM ONE PHYSICAL CONFIGURATION TO ANOTHER PHYSICAL CONFIGURATION

This application is a continuation of application Ser. No. 07/698,514 filed May 10, 1991, now abandoned.

BACKGROUND OF THE INVENTION

1. Field of the Invention

The present invention relates to the remapping of the physical addresses of a computer memory without affecting the logical addresses in use by executing programs. It is particularly useful when an interleaved memory is employed since it preserves the interleaved nature of the system.

2. Description of the Prior Art

Many computer systems employ an addressing scheme in which the actual physical addresses in the computer memory are hidden from the operating system or user programs. In such systems the executing programs view the memory as a sequential set of integers ranging from 0 to N. However, these integers may not be used directly to reference memory. Instead, the addresses used by the programs provide an indirect reference to memory. This indirect reference is known as a logical address. The memory management system has a means of associating a logical address with the actual physical address. In one embodiment a table is maintained to convert a logical address to the actual physical address.

It is sometimes desirable to change, or reconfigure, the actual physical location of the memory in use. It is also desirable to do so without adversely affecting the currently executing programs. Doing so would involve moving, or remapping, the physical location of the data while maintaining the integrity of the logical addresses in use by executing programs.

Some computer systems also employ what is known as an interleaved memory system to implement the physical layout of the data in memory. An interleaved memory spreads out the data for a given unit of information across the physical memory such that the unit of information may be accessed in a fewer number of read requests.

A common implementation is one where the unit of information is some number of sixteen bit words and only one word of information can be accessed from a memory module with a single read request. If sequential logical addresses were located in the same memory module, it would take more than one read request to access the sequential logical words.

In an interleaved memory, the sequential logical word addresses would be spread out across numerous memory modules to reduce the number of read requests to access the group of words. Ideally, the sequential logical words would be spread out across a number of memory modules equal to the maximum number of words the processor will request in a single read request. In that case, a single read issued simultaneously to all the memory modules in use would yield the entire number of words the processor requested in one read cycle.

Since an interleaved memory is physically organized as described above, the management of logical addresses becomes more complex because sequential logical addresses do not correspond to a contiguous set of physical addresses.

Previous implementations of an interleaved memory were restricted in their ability to dynamically reconfigure their physical layout. They were restricted to only using the actual physical memory with which they were initially configured. In general, the size of the interleaved memory was limited to the size of the memory initially configured.

While it may have been possible to add additional memory to the memory system, this memory would not be interleaved but would be managed separately. Physical memory could not be removed from an interleaved memory system.

The only method to move the physical location of the interleaved memory, or to shrink or expand the size of the interleaved memory, was to reinitialize the entire memory system. This is time consuming. All the data that was in memory, possibly including critical structures that may take time to reconstruct, is destroyed. The cost of doing so tends to discourage reconfiguration and cause systems to run with a less than optimal memory configuration. Additionally, if a portion of physical memory in use in an interleaved scheme is encountering problems, the entire memory system had to be reinitialized as described above to remove the problem memory from the system.

SUMMARY OF THE INVENTION

An object of this invention is to provide a means of dynamically reconfiguring a physical memory without disturbing the integrity of the data or the logical addresses in use by executing programs. This reconfiguration can be to move the physical location of the data to another physical location or to increase or decrease the size of the physical memory.

Another object of this invention is to perform such reconfiguration without requiring a reinitialization of the memory system and without requiring that the contents of memory be copied to and retrieved from secondary storage.

Another object of this invention is to perform this dynamic reconfiguration in a manner that saves time, resources, and valuable data.

Yet another object of this invention is to perform the above described reconfiguration of physical memory which has an interleaved organization while maintaining its interleaved nature.

The dynamic relocation of the interleaved memory provided by this invention permits the efficient use of resources in a computer system.

This invention also provides a means of reserving a portion of physical memory which is encountering problems by reconfiguring the physical layout of the memory. Note that this supports the ability to perform continuous system operation.

Dynamic resizing of memory enables the optimal memory size to be employed and in an interleaved fashion, if so organized.

Briefly, this invention contemplates the provision of a method and system for dynamically relocating data in a memory system, particularly one with an interleaved organization. The size of this new location could be expanded or contracted and could be interleaved, as the case may be. The remapping method insures data is read out of a physical location before relocated data is written into that location.

As mentioned earlier, when a logical addressing scheme is employed, the memory management system must have a means of associating a logical address with the actual physical address. In one embodiment a table is maintained to convert a logical address to the actual physical address. This table is referred to as the Forward Address Table or FAT. The FAT contains the list of memory addresses which are valid for a read or a write. Given a valid logical address, the FAT may be used to determine the associated physical address.

When a remap is performed the new physical addresses that are to be used must be added to the FAT and any addresses to be removed from use must be deleted from the FAT. However, while the remap is being performed, both the old and the new physical addresses must be valid for reading and writing data. This is because the data located in the old configuration must be copied to the new configuration. To meet this requirement during a remap, a temporary FAT is constructed which contains the union of the set of addresses found in both the old and the reconfigured FATs.

In remapping to a memory with an expanded number of available modules (or to a memory with the same number of modules), the remap starts at the physical addresses, P, with the lowest offset in each module addressable before the remap. An OLD_MAP table is constructed that converts these "old" physical addresses to a first set of logical addresses L' that are valid for use with the temporary FAT installed during the remap.

Data at the "old" physical address P corresponding to a first logical address $L'_1$ must be moved to the "new" physical location, P'. One approach is to read and store the data in a buffer memory during the remap. A NEW_MAP table is constructed that converts the "new" physical addresses, P', to a second set of logical addresses $L'_2$ that are valid for the temporary FAT. The data in the buffer from the first address $L'_1$ is then written back into memory at the second logical address $L'_2$ which corresponds to a physical address valid for the memory after the remap.

If the number of available modules is to be reduced in number, the remap process is the same as that just described, but the remap starts with the largest physical address offset in use and works down to the lowest offset. In this case, an additional initial step to reduce the range of logical memory addresses in use by executing programs must be performed. That is the memory management system provides that if N words are being saved from a system with M words, only logical address 0 through (M−N)−1 are being used before the remap process described above begins.

BRIEF DESCRIPTION OF DRAWINGS

The foregoing and other objects, aspects and advantages will be better understood from the following detailed description of a preferred embodiment of the invention with reference to the drawings, in which:

FIGS. 3A through 3C are a flow diagram of the remap process.

DETAILED DESCRIPTION OF A PREFERRED EMBODIMENT OF THE INVENTION

Figure 1:
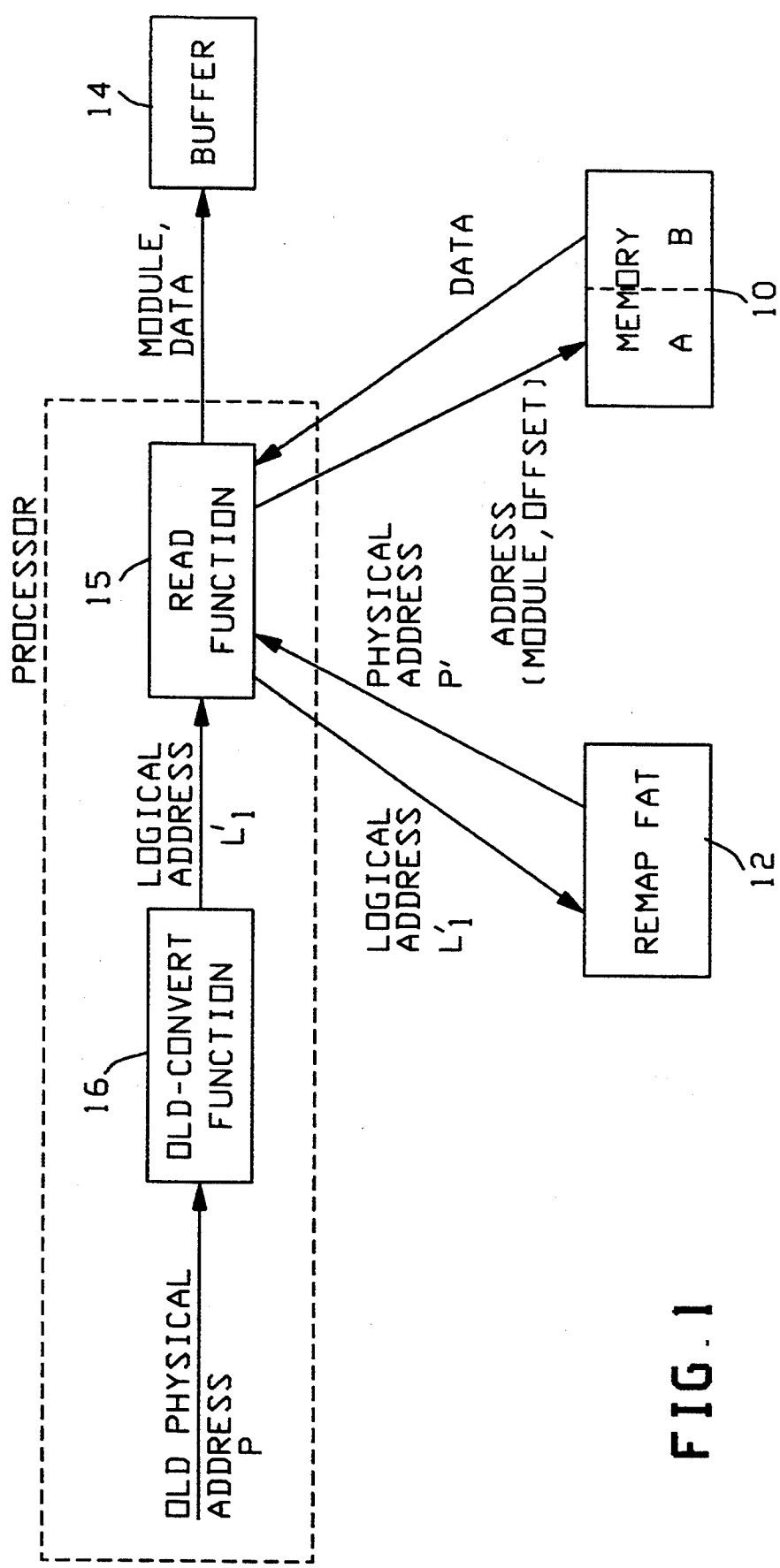
FIGS. 1 and 2 are a simplified block diagram illustrating the components involved in a remap procedure in accordance with the teachings of his invention.

Referring now to FIG. 1 of the drawings, in this simplified illustrative embodiment of the invention, a MEMORY system 10, which initially has two active modules A and B, is to be remapped to memory consisting of modules B and C. FIG. 1 facilitates an explanation of the first portion of the process; copying data from the old memory configuration to a buffer.

A temporary FAT 12, or forward address table, installed for use during the remap process describes all modules that can be read or written before and after remap. For this example, the FAT installed before the remap is valid only for physical addresses in modules A and B for logical addresses L. The FAT that will be installed after the remap will be valid only for physical addresses in modules B and C but will use the same set of logical addresses, L. Temporary FAT 12 can be used to read from or write to physical addresses for all three modules A, B, and C during the remap. It will use a set of logical addresses, L', which are valid only during the remap.

In the preferred embodiment OLD_CONVERT 16 executed by a processor is a procedure which uses the OLD_MAP table to convert physical addresses for the configuration prior to the remap to logical addresses $L'_1$, which are valid during the remap. A conventional part of computer systems, READ 15 is a procedure that copies data from a specified source to a specified destination. The READ 15 procedure copies data from logical address $L'_1$ in MEMORY 10 and stores it in BUFFER 14.

All the data for a given offset within each of the modules that are part of the old MEMORY 10 configuration are copied to BUFFER 14. For a remap to a memory with the same or a greater number of modules, the process starts with the lowest [module,offset] pair. The data placed in the BUFFER 14 is organized sequentially based on the number of modules in the old configuration.

In this example, OLD_CONVERT 16 converts the first physical address [module A,offset 0] or [A,0], to a logical address $L'_1$, that is a valid address relative to the temporary FAT 12. Using $L'_1$, READ 15 gets the data from memory at address [A,0] and puts it in BUFFER 14. This process is repeated for offset 0 in each active module in the old configuration ([B,0] in this example).

Figure 2:
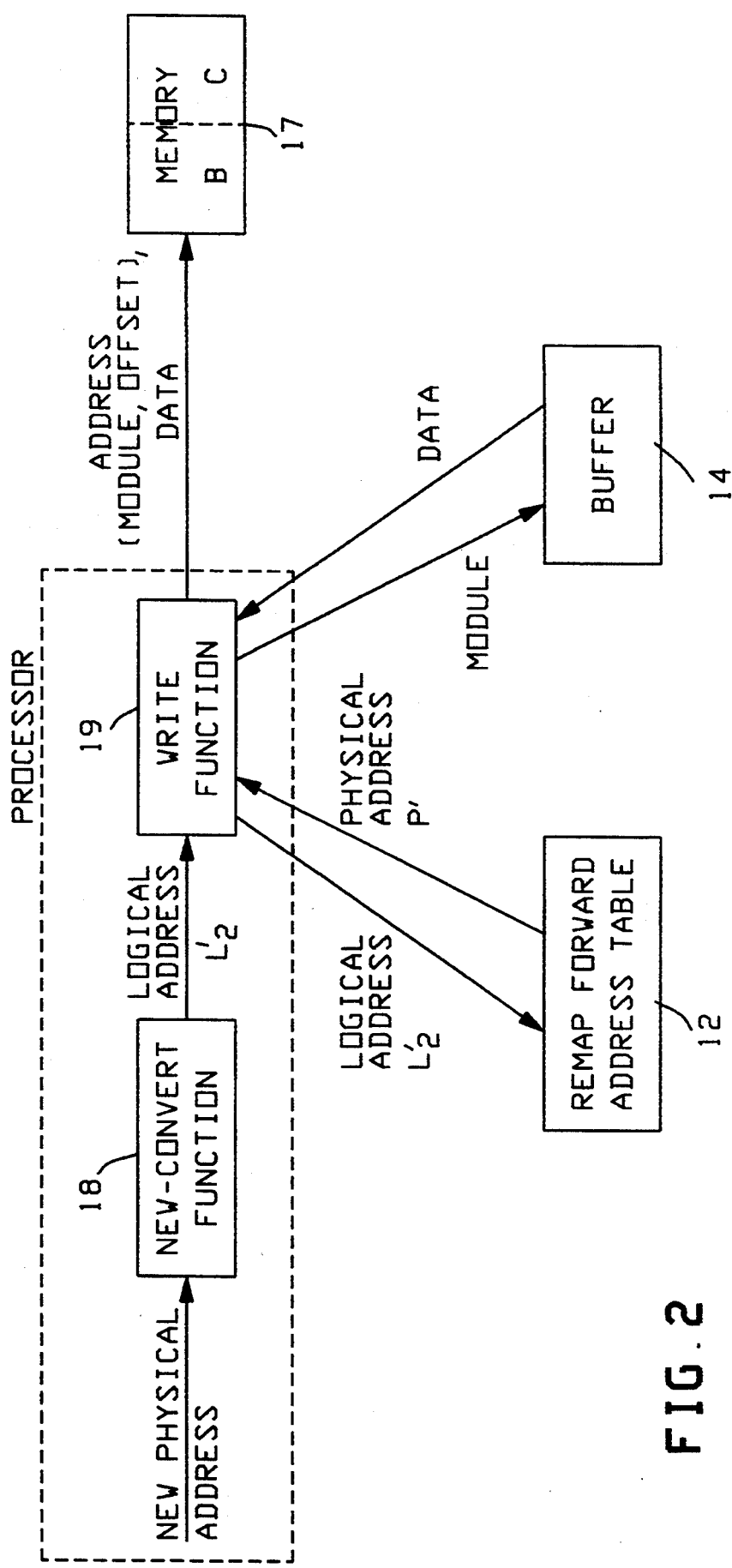

Referring now to FIG. 2, this facilitates an explanation of the second portion of the process; properly copying data from the buffer to the new memory configuration. NEW_CONVERT 18 is a procedure to convert new physical addresses for the new configuration to a second group of logical addresses $L'_2$ which are valid during the remap for the temporary FAT 12. MEMORY 17 is the reconfigured memory consisting of modules B and C. This logical address $L'_2$ is used by WRITE 19 to copy data from BUFFER 14 back to MEMORY 17.

For this example, the first physical address in the new configuration which will receive data is offset 0 in the first module or [B,0]. Given this physical address, NEW_CONVERT 18 returns a new logical address $L'_2$ which corresponds to [B,0]. WRITE 19 copies the data from BUFFER 14 for the first [module,offset] combination to MEMORY 17 using logical address $L'_2$. Remember that the data was stored in BUFFER 14 sequentially based on the number of modules. Note that data written to the first module for offset 0 in the new configuration is the data which was read from offset 0 of the first module in the old configuration.

This process of reading then writing is repeated sequentially for each offset in each of the modules. When complete, the data has been remapped into modules B and C, starting at offset 0. Here it should be again noted that data in all active modules for a given offset is read from MEMORY 10 and stored in BUFFER 14 before data from BUFFER 14 is written back into MEMORY 17. This ensures that data will not be overwritten since a location which is part of both the old and new configurations is read from before it is written to. The BUFFER 14 need only have a storage capacity equal to the number of modules in the memory prior to remap times the size of a read.

It is significant to note the relationship of the order in which the data is copied to the organization of the data in an interleaved memory structure. Assuming the data is interleaved on a module basis, copying all the data for a given offset for all the modules preserves the interleaved organization. That is, the block of data taken from the first [module,offset] combination in the old configuration is placed in the first [module,offset] combination in the new configuration. In this example, the data from [A,0] is copied to [B,0]. The data from the second [module,offset] combination in the old configuration ([B,0]) is copied to the second available block in the new configuration ([C,0]). Hence, if the data were interleaved across modules A and B in the old configuration, it remains interleaved across modules B and C in the new configuration.

The method to remap a memory system to a physical configuration with a greater number of modules is identical to the above example for one with an equal number of modules. While the above explanation was greatly simplified, those skilled in the art will recognize from the above description that this invention may be employed in a variety of systems.

The procedure for remapping to a memory system configured with fewer active modules after the remap than before the remap is similar to that just described. However, an initial step must be performed to reserve the logical addresses in use above a certain range to insure that the memory can be safely remapped. Assume the size of the memory before reconfiguration supports a range of logical addresses of 0 to M and the size of the memory after reconfiguration will support a range of logical addresses of 0 to N, where N is less than M. For this case, the logical addresses in the range from (N+1) to M must be removed from active use before the process described above can begin. Those skilled in the art will recognized that there are a variety of ways in which to accomplish this.

One way to accomplish this is to mark addresses in this range of (N+1) to M as reserved and not allocate these addresses to any program from that point in time onward. The system could then wait for addresses in this range that were already in use to be released normally. The system could also swap data in this range of logical addresses to the acceptable range of logical addresses, 0 to N. One could also swap the data in this range to secondary storage as in an overlay system. Whatever the method, the process described above to perform the physical remap for a reduction in the number of modules is not performed until only logical address 0 through N are in use. In this case, the remap procedure described above starts with the physical locations having the largest offset in use in each module.

Referring now to FIG. 3, which is a flow diagram of the remap process, this can be described with the following pseudo-code:

```
PROCEDURE REMAP_MEMORY (OLD_MAP, OLD_SIZE, NEW_MAP, NEW_SIZE);
    % OLD_MAP   A table used to convert a physical address
    %           that is valid before the remap to a
    %           logical address that is relative to the
    %           temporary FAT installed while the remap
    %           executes.

% OLD_SIZE  Number of modules before memory remap.

% NEW_MAP   A table used to convert a physical address
    %           that is valid after the remap to a logical
    %           address that is relative to the temporary
    %           FAT installed while the remap executes.

% NEW_SIZE  Number of modules after memory remap.
The constants used in the following discussion are defined as:

% MOD_SIZE  % Number of Blocks Per Module

IF OLD_SIZE <= NEW_SIZE THEN       % Add or Move Case
    BEGIN
        OFF_START := 0;
        OFF_STOP := MOD_SIZE;
        MOD_START := 0;
        MOD_STOP := OLD_SIZE;
        INCREMENT := 1;
    END
ELSE                                % Reserve Case
    BEGIN
        OFF_START := MOD_SIZE-1;
        OFF_STOP := -1;
        MOD_START := NEW_SIZE-1;
        MOD_STOP := -1;
        INCREMENT := -1;
    END;

OFFSET := OFF_START;
    WHILE OFFSET NEQ OFF_STOP DO
        BEGIN
            MOD := MOD_START;
```

```
    WHILE MOD NEQ MOD_STOP DO
      BEGIN
        LOG := OLD_CONVERT(MOD, OFFSET);
        READ(BUFFER[MOD], LOG);
        MOD := MOD + INCREMENT;
      END;
    MOD := MOD_START;
    WHILE MOD NEQ MOD_STOP DO
      BEGIN
        LOG := NEW_CONVERT(MOD, OFFSET);
        WRITE(BUFFER[MOD], LOG);
        MOD := MOD + INCREMENT;
      END;
    OFFSET := OFFSET + INCREMENT;
    END;
```

Following is a list of procedures referenced above and their descriptions:

| | |
|---|---|
| OLD_CONVERT(MOD, OFFSET) | is a procedure that takes a physical memory block address in the form module (MOD) and offset (OFFSET) and converts it to a logical block address using OLD_MAP. This logical address is used to perform a memory read. |
| NEW_CONVERT(MOD, OFFSET) | is a procedure that takes a physical memory block address and maps it to a logical block address that can be used to perform a memory write. It has the same definition as the OLD_CONVERT procedure, except NEW_MAP is used instead of OLD_MAP. |
| READ(BUFFER, LOG) | reads the data at logical memory address LOG into BUFFER. |
| WRITE(BUFFER, LOG) | writes the data contained in BUFFER into the logical memory address LOG. |

Figure 3A:
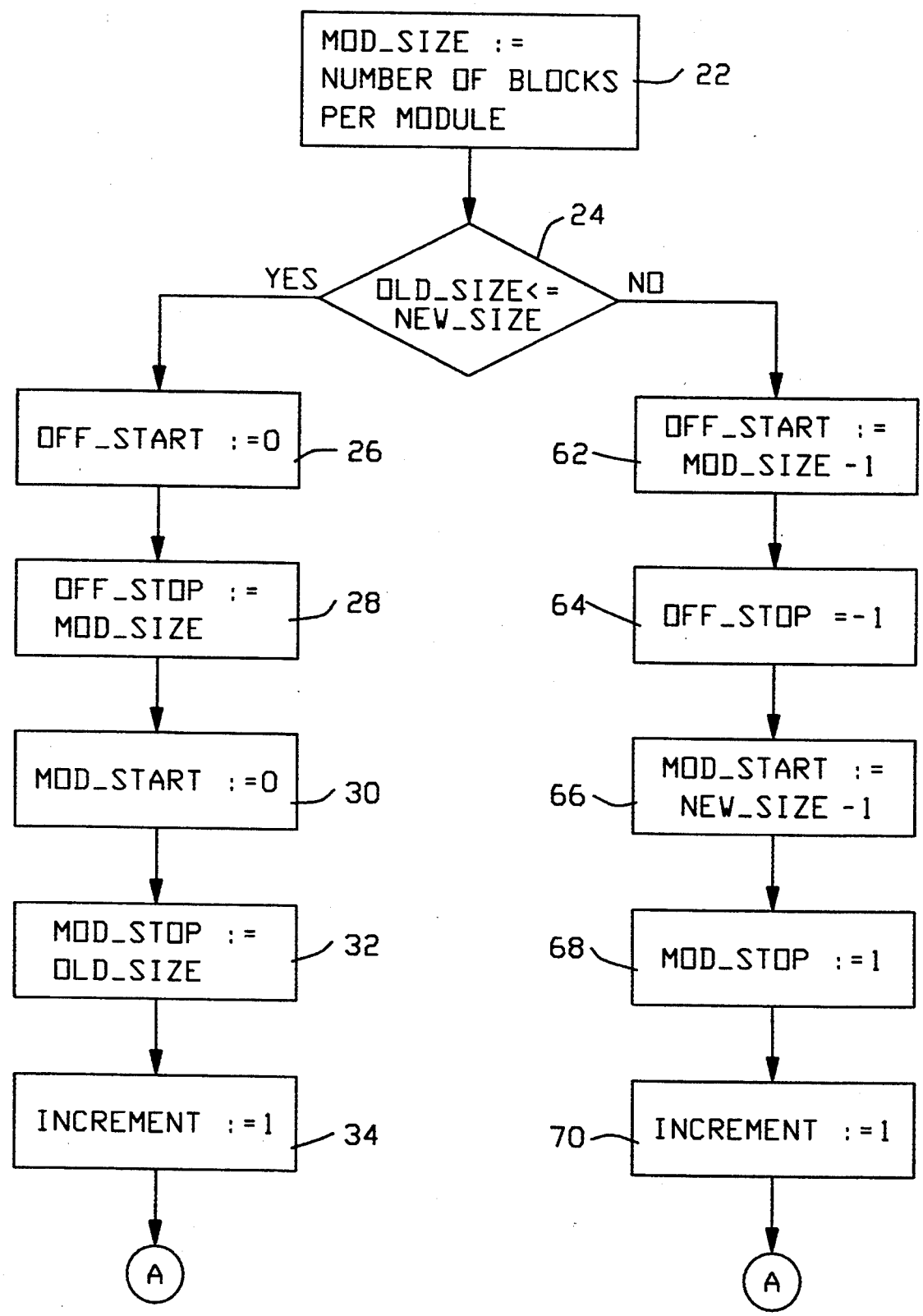

Starting with FIG. 3A, it shows the initializing conditions: in block 22 the module size (i.e., addressable blocks per module) is entered; and in decision block 24 a comparison is made of the relative size of the memory before remap compared with the size after remap. Considering first the case where old size is less than or equal to the new size (YES), in block 26 the program is initialized to start at physical address offset 0 and in block 28 to stop at the last offset, which has been entered in block 22. The starting module is entered in block 30 (e.g., module 0) the stopping module (old size) in block 32 and the incrementing value (1) is entered in block 34. Referring now to FIG. 3B, as indicated at block 36 the remap process starts initially here with offset (0) and decision block 38 compares this offset value to the largest offset value of the memory, entered as an initial condition in block 22. Assuming this comparison is not equal (NO), the flow proceeds to block 40 which provides the module value (initially 0). Next, block 42 compares the module value to the number of modules in the memory system entered as an initial condition in block 20.

If the decision in block 42 is NO, block 44 generates a logical address LOG from the OLD_MAP table using the physical memory address module (MOD) and offset (OFFSET). LOG is used in block 46 to perform a memory read where the data at logical address LOG is read into a buffer. The OLD_MAP and the FAT are so constructed that they guarantee a physical address that is within the modules that are valid before remap. Block 48 increments the module value by "increment" and the subroutine repeats until all of the modules for a given offset are read at which time the process goes, at block 42, to C.

Figure 3C:
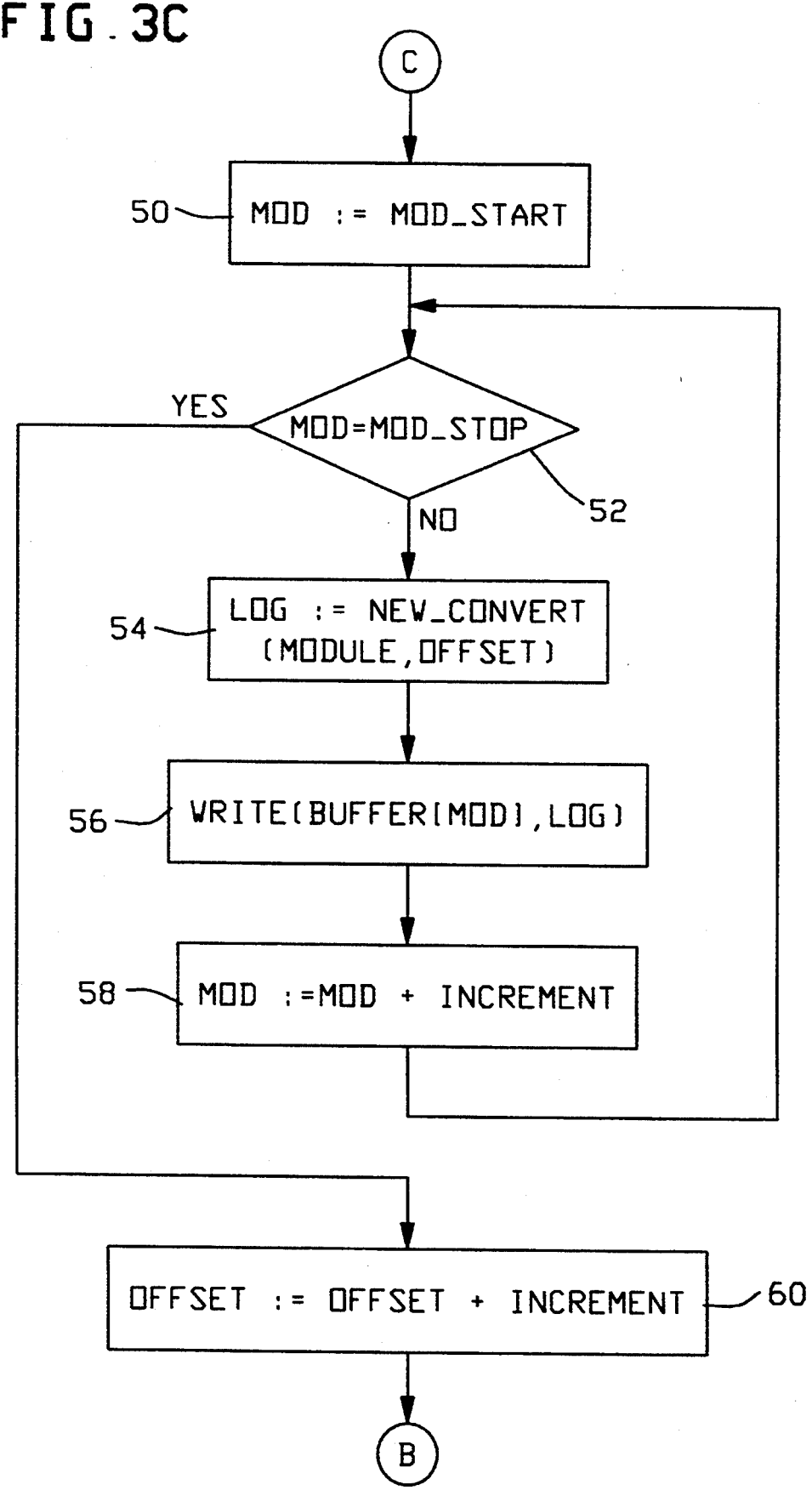

Referring now to FIG. 3C, block 50 reinitializes the value of MOD so that the cycle through the valid new modules may occur. Decision block 52 compares the MOD value with the number of modules in the new memory configuration. If the values are not equal, block 54 generates a logical address LOG' from the NEW_MAP table using the physical memory address module (MOD) and offset (OFFSET). This logical address LOG' is used in block 56 to write data contained in the buffer into the main memory at the logical address LOG'. The NEW_MAP and the FAT are so constructed that they guarantee a physical address that is within the modules that are valid after remap.

Block 58 increments the module value by "increment" and the loop repeats until decision block 52 detects a module value equal to the number of modules which causes the flow to proceed to block 58 to increment the offset and return to block 38 where the process repeats until decision block 38 detects an offset value equal to ending offset of the memory at which time the remap is complete and the process ends.

The process for a remap to a memory with fewer modules is also shown by FIG. 2. It starts at decision block 24. Here the process is the same as that just described except that the starting offset, block 62, is the largest offset in use and the operation completes when the lowest valid offset is in use. A detailed description with respect to this operation would be largely repetitious and therefore omitted.

It is appropriate at this point to expound upon the origin of the tables involved in the reconfiguration. Initially there is a logical addressing means, FAT1, by which a logical address L is equated to the correct physical address. This logical-to-physical addressing means may be organized as appropriate for the given computer system. In the example embodiment, the physical address is of the form [module,offset]. Programs executing on the system use only this logical address, L, to reference data in memory. The memory management system converts references to logical addresses L to actual physical addresses P by means of FAT1.

In this example, only modules A and B are in use before the remap. As such, FAT1 only uses physical addresses for modules A and B. For this example, a very simple organization will be explained. It will be obvious to those skilled in the art that much more complex logical addressing schemes could be employed while using the disclosed invention.

Here, logical addresses are assigned sequentially from 0 to N−1 to physical address [module,offset] pairs. N equals the number of valid offsets in a module times the number of modules. Here, there are 3 valid offsets (0,1,2) in each module and there are two modules. Hence, N=(3*2)=6 and the logical addresses range from 0 to 5. Using this, the first logical address, 0, is assigned in FAT1 to the first physical address, [A,0]. The second logical address, 1, is assigned to [B,0]. The third, 2, is assigned to [A,1] and so on.

| FAT1 (OLD) | | |
|---|---|---|
| LOGICAL INDEX L | PHYSICAL MOD | OFF |
| 0 | A | 0 |
| 1 | B | 0 |
| 2 | A | 1 |
| 3 | B | 1 |
| 4 | A | 2 |
| 5 | B | 2 |

The remap changes the physical mapping such that only modules B and C are in use. While FAT1 is the current addressing means, only modules A and B may be addressed.

It is necessary to be able to address modules A, B, and C to perform the remap. An addressing means is created, FAT2, which can address all three modules. FAT2 is temporarily installed as the current addressing means during the remap. The logical addresses which FAT2 recognizes, L', are only valid during the remap and are not used by any user programs.

FAT2 is constructed in the same manner as for FAT1. The total number of valid offsets is 3 and there are three modules in use so N=3*3=9 and the logical addresses L' will range from 0 to 8. Sequentially assigning the valid physical addresses yields the following FAT2 table:

| FAT2 (TEMPORARY) | | |
|---|---|---|
| LOGICAL INDEX L' | PHYSICAL MODULE | OFFSET |
| 0 | A | 0 |
| 1 | B | 0 |
| 2 | C | 0 |
| 3 | A | 1 |
| 4 | B | 1 |
| 5 | C | 1 |
| 6 | A | 2 |
| 7 | B | 2 |
| 8 | C | 2 |

Note that the logical addresses in FAT2 do not necessarily correspond to the same physical address as they did in FAT1. For instance, logical address value "2" in FAT1 yields physical address [A,1]. For FAT2 that same logical address value, "2", yields physical address [C,0]. Since FAT2 is the logical addressing means in use during the reconfiguration, the old logical addresses, L, are obviously invalid during the remap and may not be used. However, the physical addresses from the old configuration are known and valid.

Given a known set of physical addresses in modules A and B, and a known set of logical addresses in the temporary addressing means, FAT2, it is necessary to relate a given physical address, [module,offset], to its corresponding logical address, L' in FAT2 To accomplish this, a cross-reference means, OLD_MAP, is constructed.

One way to build OLD_MAP is to make a table where each element of the table is associated with a valid physical addresses in the old configuration. Then, by examining FAT2, place the appropriate FAT2 index for each physical address in OLD_MAP into its associated OLD_MAP element. For this example, this yields the following OLD_MAP:

| OLD MAP | |
|---|---|
| INDEX MOD,OFF | LOGICAL FAT2 L' |
| A,0 | 0 |
| B,0 | 1 |
| A,1 | 3 |
| B,1 | 4 |
| A,2 | 6 |
| B,2 | 7 |

A physical address from the old configuration can be used to index into OLD_MAP. This yields the appropriate logical address in FAT2 to use to read from or write to that physical address during the remap.

For example, to access the data at physical address [B,2] requires the associated logical address. Indexing into OLD_MAP at [B,2] yields logical address value of "7". The way to verify this is to index into FAT2 for a logical address value of "7" which returns physical address [B,2] as expected. Note that logical address value "7" did not even exist in the original FAT1. It is only valid while FAT2 is installed during the remap.

The remap process begins by reading all the data from a given physical offset in all the modules in the old configuration. In this example, this begins at the lowest offset in the first module which is module A, offset 0 or [A,0]. Using reference means OLD_MAP, this physical address is found to correspond to logical address 0 in FAT2. Hence a read from logical address 0 is performed.

Proceeding then to [B,0], the use of OLD_MAP reveals that this corresponds to logical address 1 and a read from logical address 1 is performed. This completes the reads from offset 0 for all modules in the old configuration and the process proceeds to the write step.

Recall that a principle object of this invention is to maintain the interleaving of the data used in the old configuration. As such, the block of data taken from the first [module,offset] combination in the old configuration is placed in the first [module,offset] combination in the new configuration. In this example the data from [A,0] in the old configuration is placed at that is [B,0] in the new configuration.

Again, given a physical address in the new configuration, it is necessary to determine its associated logical address, L' to perform a write Another reference means, NEW_MAP, is constructed which relates a given physical address in the new physical configuration to its appropriate logical address, L'2 in FAT2. It is constructed in manner similar to that used to construct OLD_MAP. In this example this yields:

| NEW MAP | |
|---|---|
| INDEX-PHYSICAL MOD,OFF | LOGICAL FAT2 L' |
| B,0 | 1 |
| C,0 | 2 |
| B,1 | 4 |
| C,1 | 5 |
| B,2 | 7 |
| C,2 | 8 |

Using NEW_MAP for physical address [B,0], it is determined that the associated L' is 1. The first block of data in the buffer is written to logical address 1 in FAT2, which corresponds to physical address [B,0]. Note that while this overwrites data which was part of the old configuration, the data from location [B,0] has already been read into the buffer. In this way no data is lost.

Proceeding with the write step, the next physical offset to use is [C,0]. Using NEW_MAP to determine the corresponding logical address L'2, the write is performed at logical address 2. This completes the writing of data for offset 0.

This process now repeats for the data at offset 1 in all modules, and then for offset 2 in all modules, and continues until all data from the old configuration is moved.

Given that modules B and C that will be part of the new configuration, another logical addressing means, FAT3, is constructed in the same manner that FAT1 was constructed.

| FAT3 (NEW) | | |
|---|---|---|
| LOGICAL INDEX L | PHYSICAL MODULE | OFFSET |
| 0 | B | 0 |
| 1 | C | 0 |
| 2 | B | 1 |
| 3 | C | 1 |
| 4 | B | 2 |
| 5 | C | 2 |

This FAT3 is used for addressing the new physical configuration. It replaces FAT2 as the current logical addressing means. FAT2, OLD_MAP, and NEW_MAP are discarded and the remap is complete.

Because of the method in which the remap was performed, the old logical addresses in use with FAT1 are all valid for FAT3 and will return the correct data. For instance, logical address 0 corresponds to physical address [A,0] in FAT1 and [B,0] in FAT3. Note that the remap moved the data that was at [A,0] in the old configuration to [B,0] in the new configuration. Hence, all executing programs can continue to use the same logical addresses without being affected by the physical relocation of data in memory.

What is claimed is:

1. A method of remapping stored data in a memory system that before said remapping comprises a first set of memory areas in said memory system that contain said data arranged in a first group of physical memory blocks that are each initially accessed by a first set of logical addresses supplied to said memory system, and that after said remapping comprises a second set of memory areas in said memory system that contain said data in a second group of physical memory blocks that are accessed by said first set of logical addresses, comprising the steps of:

recording a first correspondence table that provides a means to relate said first set of logical addresses to said first group of physical memory blocks in said memory system;

recording a second correspondence table that provides a means to relate a second set of logical addresses to said memory areas of both said first and second groups of physical memory blocks;

removing selected physical memory blocks from said first group of physical memory blocks;

adding selected physical memory blocks to form said second group of physical memory blocks;

recording a third correspondence table that provides a means to relate said first set of logical addresses to said second group of physical memory blocks;

mapping the physical addresses of said first group of physical memory blocks into a first map that records the relationship of said physical addresses of said first group of physical memory blocks with respect to logical addresses from said second correspondence table prior to recording said third correspondence table;

mapping the physical addresses of said second group of physical memory blocks into a second map that records the relationship of said physical addresses of said second group of physical memory blocks with respect to logical addresses selected from said second correspondence table prior to recording said third correspondence table; and utilizing said first and second maps to perform said removing and said adding of physical memory blocks.

2. A system for remapping stored data in a memory system wherein said memory system comprises a first set of memory areas in said memory system that contain said stored data arranged in a first group of physical memory blocks that are each initially accessed by supplying a first set of logical addresses to an access means, and that after said remapping said memory system comprises a second set of memory areas in said memory system that contain said stored data in a second group of physical memory blocks that are accessed by supplying said first set of logical address to said access means, said system for remapping comprising:

a first correspondence table for recording and determining the relationship between said first set of logical addresses and said first group of physical memory blocks in said memory system;

a second correspondence table for recording and determining the relationship between a second set of logical addresses comprising said memory areas of both said first group and said second group of physical memory blocks;

a rearrangement means for removing selected physical memory blocks from said first group of physical memory blocks in said memory system and for adding selected physical memory blocks to form said second group of physical memory blocks in said memory system;

a third correspondence table for recording and determining the relationship between said first set of logical addresses and said second group of physical memory blocks;

a first map storage area in said memory system for mapping the physical addresses of said first set of physical memory blocks into said first map storage area and for recording the relationship of said physical addresses of said first set of physical memory blocks with respect to logical addresses from said second correspondence table prior to recording said third correspondence table, and a second map storage area for mapping the physical addresses of said second set of physical memory blocks into said second map storage area and for recording the relationship of said physical addresses of said second set of physical memory blocks with respect to logical addresses selected from said second correspondence table prior to recording said third correspondence table, wherein said arrangements means is constructed to utilize said first and second maps to remove and to add said physical memory blocks.

3. In a memory system in which data is stored in a first configuration of physical locations in said memory system and employing a first set of logical addresses to access said data in said first configuration of physical locations in said memory system, a method for remapping said data to a second configuration of physical locations in said memory system wherein said second configuration of physical locations in said memory system includes at least one physical location from said first configuration of physical locations in said memory system and whereby said data in said second configuration of physical locations in said memory system is accessed by said first set of logical addresses, comprising the steps of:

determining a first physical memory location in said first configuration of physical locations in said memory system from which to relocate said data;

determining a second physical location in said second configuration of physical locations in said memory system at which to relocate said data;

moving said data from said first physical memory location to said second physical memory location;

repeating said first three steps until all data in said first configuration of physical locations in said memory system has been moved to physical locations in said second configuration of physical locations in said memory system;

associating said first set of logical addresses with said physical locations of said data in said second configuration of physical locations in said memory system;

establishing a second set of logical addresses sufficient to address all physical locations in both said first configuration of physical locations in said memory system and said second configuration of physical locations in said memory system; and associating said second set of logical addresses with said physical locations in said first configuration of physical locations in said memory system and said second configuration of physical locations in said memory system.

4. A method according to claim 3 further comprising the steps of:

establishing a first cross-reference means for associating said physical locations of said first configuration of physical locations in said memory system with said second set of logical addresses;

establishing a second cross-reference means for associating said physical locations of said second configuration Of physical locations in said memory system with said second set of logical addresses.

5. A method according to claim 4 wherein said moving comprises the steps of:

determining a first address in said second set of logical addresses from which to read said data by using said first beginning physical offset in said first configuration of physical locations in said memory system and said first cross-reference means;

reading said data stored in said first configuration of physical locations in said memory system using said first address in said second set of logical addresses;

storing said data in a storage means;

determining a second address in said second set of logical addresses at which to write said data in said second configuration of physical locations in said memory system by using said second beginning physical offset in said second configuration of physical locations in said memory system and said second cross-reference means;

writing said stored data back into said second configuration of physical locations in said memory system using said second address in said second set of logical addresses.

6. In a memory system in which data is stored in a first configuration of physical locations in said memory system and employing a first set of logical addresses to access said data in said first configuration of physical locations in said memory system, a method for remapping said data to a second configuration of physical locations in said memory system wherein said second configuration of physical locations in said memory system includes at least one physical location from said first configuration of physical locations in said memory system and whereby said data in said second configuration of physical locations in said memory system is accessed by said first set of logical addresses, comprising the steps of:

a) determining a first physical memory location in said first configuration of physical locations in said memory system from which to relocate said data, said determining further step comprising:

i) comparing the size of said second configuration of physical locations in said memory system to the size of said first configuration of physical locations in said memory system;

ii) establishing a first beginning physical offset and a second beginning physical offset for said remapping at the lowest physical offset in each of said first configuration of physical locations in said memory system and said second configuration of physical locations in said memory system respectively if the size of said second configuration of physical locations is equal to or greater than the size of said first configuration of physical locations;

iii) reserving logical addresses which will not be used after said remapping is completed and establishing said first beginning physical offset and said second beginning physical offset for said remapping at the highest physical offset in each of said first configuration of physical locations in said memory system and said second configuration of physical locations in said memory system respectively if the size of said second configuration of physical locations is less than the size of said first configuration of physical locations;

b) determining a second physical location in said second configuration of physical locations in said memory system at which no relocate said data;

c) moving said data from said first physical memory location to said second physical memory location;

d) repeating steps a), b) and c) until all data in said first configuration of physical locations in said memory system has been moved to physical locations in said second configuration of physical locations in said memory system; and e) associating said first set of logical addresses with said physical locations of said data in said second configuration of physical locations in said memory system.

7. In a memory system in which data is stored in a first configuration of physical locations in said memory system and employing a first set of logical addresses to access said data in said first configuration of physical locations in said memory system, a method for remapping said data to a second configuration of physical locations in said memory system whereby said data in said second configuration of physical locations in said memory system is accessed by said first set of logical addresses, comprising the steps of:

a) determining said second configuration of physical locations such that said second configuration is different than said first configuration and said second configuration includes at least one physical location of said first configuration but not all physical locations of said first configuration;

b) determining a first physical memory location in said first configuration of physical locations in said memory system from which to relocate said data;

c) determining a second physical location in said second configuration of physical locations in said memory system at which to relocate said data;

d) moving said data from said first physical memory location to said second physical memory location;

e) repeating steps b), c) and d) until all data in said first configuration of physical locations in said memory system has been moved to physical locations in said second configuration of physical locations in said memory system; and f) associating said first set of logical addresses with only said physical locations of said data in said second configuration of physical locations in said memory system.

8. A method according to claim 7 wherein moving step comprises the steps of:

reading said data stored in said first configuration of physical locations in said memory system;

storing said data in a storage means;

writing said stored data back from said storage means into said second configuration of physical locations in said memory system.

9. A method according to claim 8 or claim 5 wherein: said storage means is a buffer.

10. In a memory system in which data is stored in a first configuration of physical locations in said memory system and employing a first set of logical addresses to access said data in said first configuration of physical locations in said memory system, a method for remapping said data no a second configuration of physical locations in said memory system whereby said data in said second configuration of physical locations in said memory system is accessed by said first set of logical addresses, comprising the steps of:

a) determining said second configuration of physical locations such that said second configuration is different than said first configuration and said second configuration includes at least one physical locations of said first configuration but not all physical locations of said first configuration;

b) establishing a temporary addressing means capable of addressing the physical locations in both the first and second configurations;

c) determining a first physical memory location in said first configuration of physical locations in said memory system from which to relocate said data;

d) determining a second physical location in said second configuration of physical locations in said memory system at which to relocate said data;

e) moving, using said temporary addressing means, said data from said first physical memory location to said second physical memory location, the step of moving said data further comprises the step of moving said data to an intermediate physical storage location which is separate and distinct from either said first configuration or said second configuration;

f) repeating steps c), d) and e) until all data in said first configuration of physical locations in said memory system has been moved to physical locations in said second configuration of physical locations in said memory system; and g) associating said first set of logical addresses with said physical locations of said data in said second configuration of physical locations in said memory system.

11. The method of claim 10, wherein the data stored in the memory system is interleaved data.

* * * * *